US011462101B2

(12) United States Patent
Rakshit et al.

(10) Patent No.: US 11,462,101 B2
(45) Date of Patent: Oct. 4, 2022

(54) NON-ESSENTIAL AUTONOMOUS VEHICLE REROUTING

(71) Applicant: INTERNATIONAL BUSINESS MACHINES CORPORATION, Armonk, NY (US)

(72) Inventors: Sarbajit K. Rakshit, Kolkata (IN); Martin G. Keen, Ventura, NC (US); John M. Ganci, Jr., Raleigh, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 16/686,385

(22) Filed: Nov. 18, 2019

(65) Prior Publication Data
US 2021/0150896 A1 May 20, 2021

(51) Int. Cl.
G05D 1/00 (2006.01)
G08G 1/01 (2006.01)
G08G 1/00 (2006.01)
G05D 1/02 (2020.01)

(52) U.S. Cl.
CPC ......... G08G 1/0145 (2013.01); G05D 1/0088 (2013.01); G05D 1/0287 (2013.01); G08G 1/0125 (2013.01); G08G 1/20 (2013.01); G05D 2201/0213 (2013.01)

(58) Field of Classification Search
None
See application file for complete search history.

(56) References Cited

U.S. PATENT DOCUMENTS 7,979,173 B2 7/2011 Breed
8,483,940 B2 7/2013 Chapman
9,428,187 B2 8/2016 Lee
(Continued)

FOREIGN PATENT DOCUMENTS

CN 106940933 A 7/2017

OTHER PUBLICATIONS

Anonymous, Method and system for lane change of self-driving car; IP.com Prior Art Dadabase Technical Disclosure, Jan. 6, 2016, ip.com No. IPCOM000244696D, entire document, https://ip.com/IPCOM/000244696.
(Continued)

Primary Examiner — James M McPherson
(74) Attorney, Agent, or Firm — Patrick J. Daugherty; Brian M. Restauro

(57) ABSTRACT

Aspects of the present invention determine positional data for each of a plurality of autonomous vehicles travelling on a common roadway that includes geographic coordinate location, vehicle speed, speed change and vehicle lane position data; determine a reaction value as an amount of change in positional data of a first autonomous vehicles caused in reaction to a causal change in positional data of a second of the autonomous vehicle; associate the reaction value to a volume of traffic flow at a time of occurrence; and, in response to a request for a change to positional data of a third autonomous vehicle that is similar to the causal change, estimate a cost of the request as a change to positional data of a fourth autonomous vehicles projected from the reaction value in proportion to a similarity of a traffic flow volume.

19 Claims, 5 Drawing Sheets

(56) References Cited

U.S. PATENT DOCUMENTS

| | | |
|---|---|---|
| 2008/0004789 A1 | 1/2008 | Horvitz |
| 2010/0324817 A1 | 12/2010 | Hansen |
| 2012/0310465 A1 | 12/2012 | Boatright |
| 2013/0190964 A1 | 7/2013 | Uehara |
| 2014/0278052 A1 | 9/2014 | Slavin |
| 2018/0099676 A1* | 4/2018 | Goto .................... B60W 30/10 |

OTHER PUBLICATIONS

Peter Mell et al, The NIST Definition of Cloud Computing, National Institute of Standards and Technology, Publication 800-145, 2011, entire document.

* cited by examiner

NON-ESSENTIAL AUTONOMOUS VEHICLE REROUTING

TECHNICAL FIELD

The present invention relates generally to a method, system, and computer program product for autonomous vehicle navigation. More particularly, the present invention relates to a method, system, and computer program product for controlling the execution of navigation routing in autonomous vehicles.

BACKGROUND

Turn-by-turn routing is a common feature of cellular and global positioning satellite (GPS) navigation devices wherein directions to execute a selected route to a destination are continually and dynamically calculated and used to provide routing instructions to an autonomous vehicle or to a user, including via spoken or visual instructions.

Navigation systems generally update and revise a generated route on continual basis, to select best options between alternative roadways, mass transit options, walk-ways, etc., to combine to generate a route that meets user cost or quality or overall objective specifications (for example, shortest travel time or distance, lowest total cost for transit or toll fees, avoiding highways or toll-ways, etc.), including in response to changes in option conditions (for example, traffic loading or travel times, times and duration of temporary road closures or lane loading assignments and permissions, available ferry departure times, etc.)

Autonomous or self-driving vehicles refers to vehicles that use artificial intelligence or multi-agent systems to drive themselves and otherwise control movement of the vehicle as it travels to a destination, without active guidance or intervention of human assistance from passengers travelling therein. Autonomous vehicles utilize a variety of image, radar and other sensors to obtain data representative of objects within a surrounding environment, and understand the movements and locations of objects as function of applying motion models to the obtained data, to predict and execute safe routing and other movement through the environment with little or no human input.

BRIEF SUMMARY

In one aspect of the present invention, a computer-implemented method includes determining positional data for each of a plurality of autonomous vehicles that are travelling on a common roadway, wherein the positional data includes geographic coordinate location data, vehicle speed and speed change data and vehicle lane position data; determining a reaction value as an amount of change in positional data of a first of the autonomous vehicles that is caused in reaction to a causal change in the positional data of another, second of the autonomous vehicles; associating the reaction value to a volume of traffic flow on the common roadway at a time of occurrence of the amount of change in the positional data of the first autonomous vehicle; and, in response to a request for a change to positional data of a third of the autonomous vehicles that is similar to the causal change in the positional data of the second autonomous vehicle, estimating a cost of the request as a change to the positional data of a fourth of the autonomous vehicles that is projected from the reaction value in proportion to a similarity of a volume of traffic flow on the common roadway at the time of the request to the volume at the occurrence time of the change in the positional data of the first autonomous vehicle.

In another aspect, a computer system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby determine positional data for each of a plurality of autonomous vehicles that are travelling on a common roadway, wherein the positional data includes geographic coordinate location data, vehicle speed and speed change data and vehicle lane position data; determine a reaction value as an amount of change in positional data of a first of the autonomous vehicles that is caused in reaction to a causal change in the positional data of another, second of the autonomous vehicles; associate the reaction value to a volume of traffic flow on the common roadway at a time of occurrence of the amount of change in the positional data of the first autonomous vehicle; and, in response to a request for a change to positional data of a third of the autonomous vehicles that is similar to the causal change in the positional data of the second autonomous vehicle, estimate a cost of the request as a change to the positional data of a fourth of the autonomous vehicles that is projected from the reaction value in proportion to a similarity of a volume of traffic flow on the common roadway at the time of the request to the volume at the occurrence time of the change in the positional data of the first autonomous vehicle.

In another aspect, a computer program product has a computer-readable storage medium with computer readable program code embodied therewith. The computer readable program code includes instructions for execution by a computer processor that cause the computer processor to determine positional data for each of a plurality of autonomous vehicles that are travelling on a common roadway, wherein the positional data includes geographic coordinate location data, vehicle speed and speed change data and vehicle lane position data; determine a reaction value as an amount of change in positional data of a first of the autonomous vehicles that is caused in reaction to a causal change in the positional data of another, second of the autonomous vehicles; associate the reaction value to a volume of traffic flow on the common roadway at a time of occurrence of the amount of change in the positional data of the first autonomous vehicle; and, in response to a request for a change to positional data of a third of the autonomous vehicles that is similar to the causal change in the positional data of the second autonomous vehicle, estimate a cost of the request as a change to the positional data of a fourth of the autonomous vehicles that is projected from the reaction value in proportion to a similarity of a volume of traffic flow on the common roadway at the time of the request to the volume at the occurrence time of the change in the positional data of the first autonomous vehicle.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
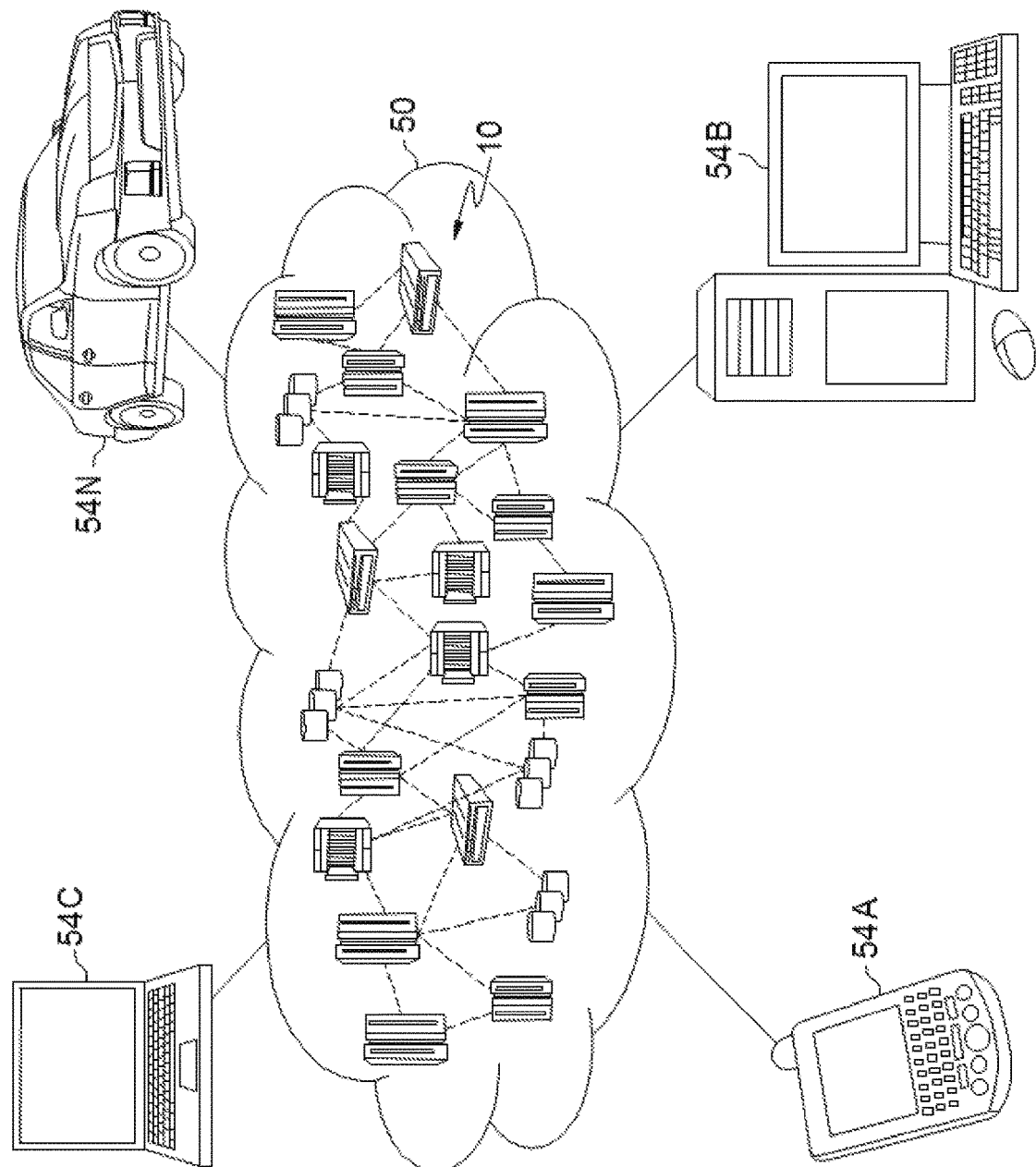
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
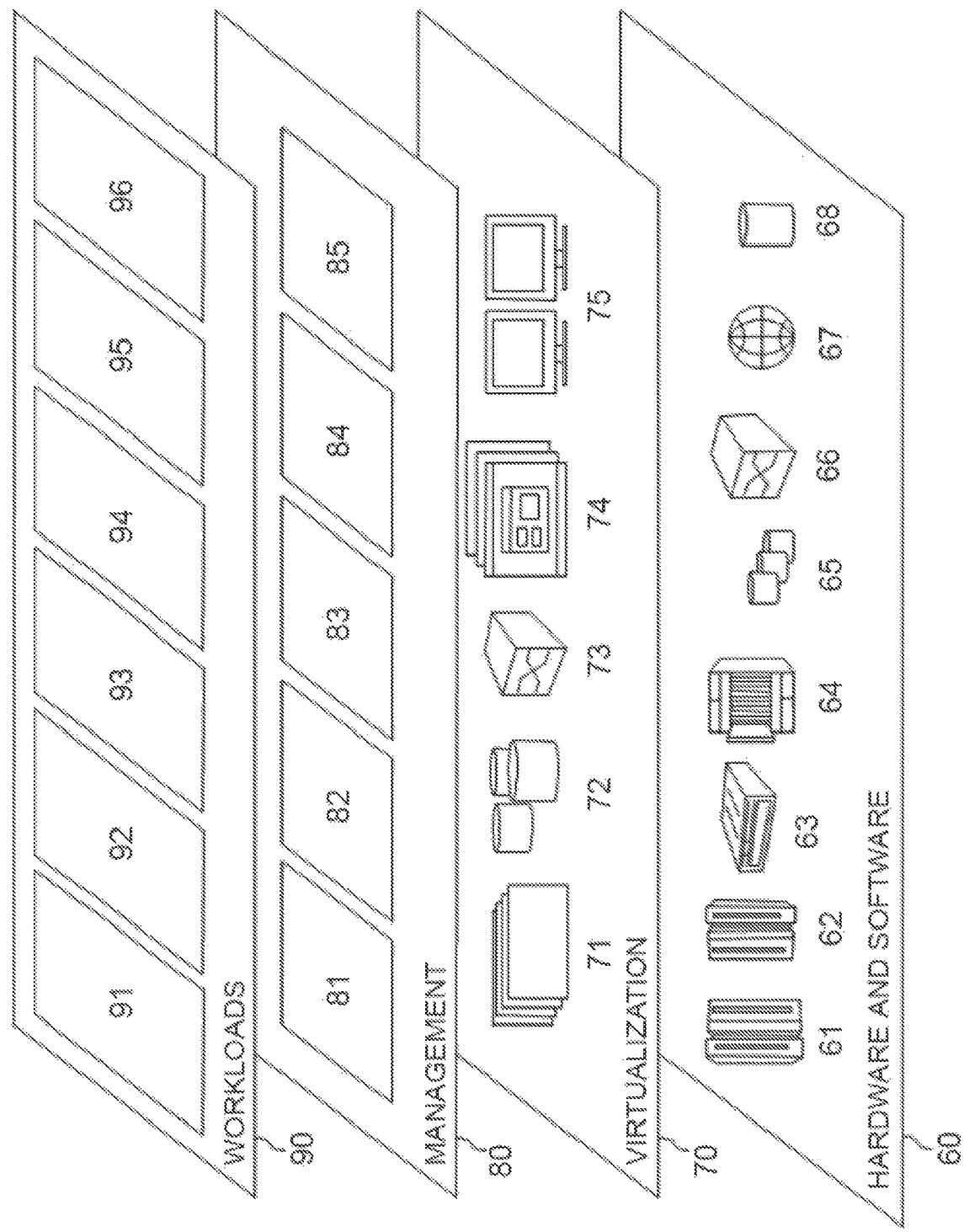
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for determining whether to approve an autonomous vehicle routing change request as a function of priority value and cost or impact to other autonomous vehicles according to aspects of the present invention 96.

Figure 3:
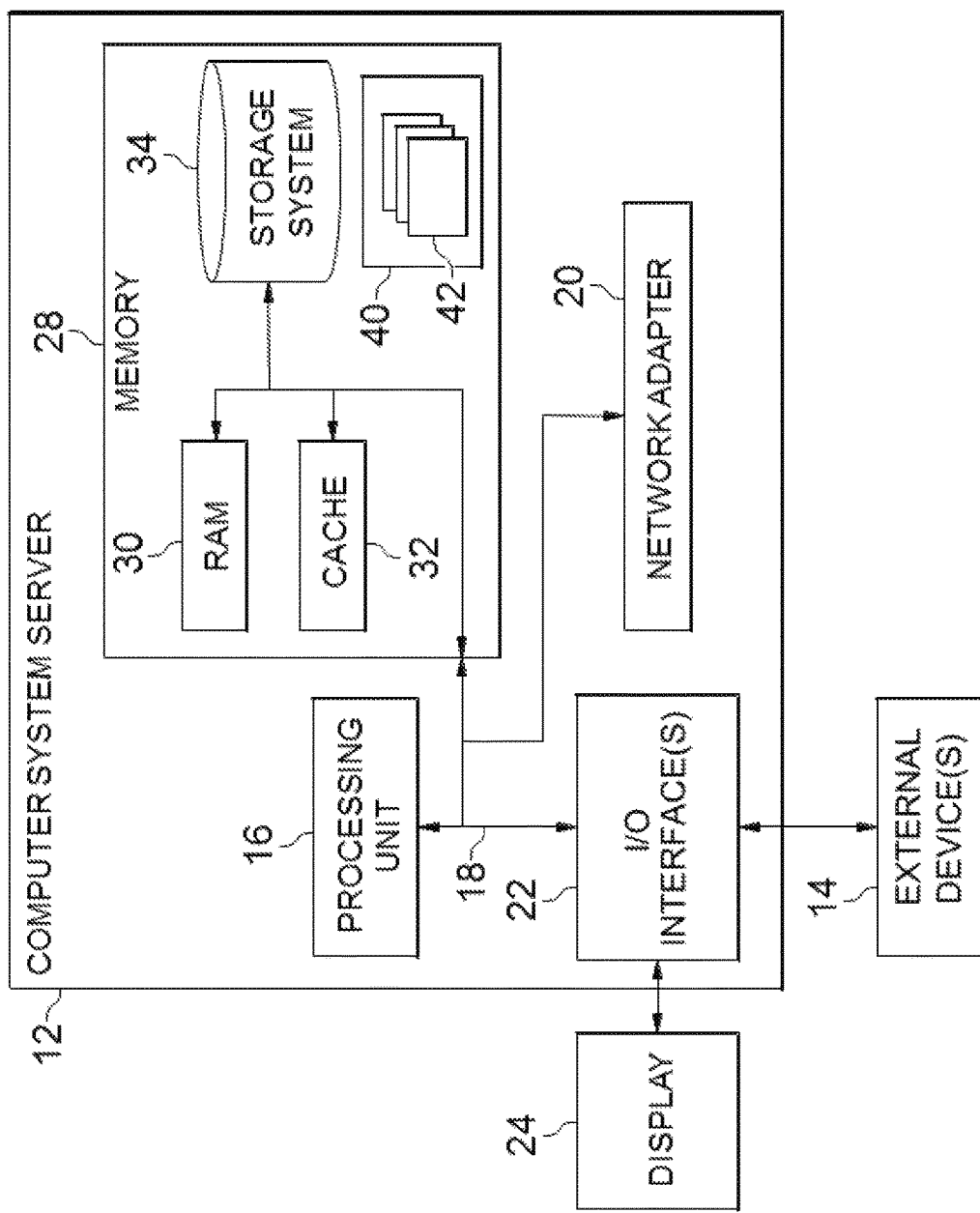
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Navigation device turn-by-turn applications provide convenient and dynamically changeable navigation route options for use in a journey to a particular destination that may vary in response to different objective values or definitions: for example, a first route is generated that has a quick rate or total travel time in response to an instruction to "take the fastest route," wherein a different, second route of travel is executed that has a relatively slower rate or increased total travel time or distance covered in response to an instruction to "take curvy roads" and "avoid highways." Users may also disregard specified routes during temporary detours or divergence to meet another objective, such as to take a break for a meal, or to suddenly slow down and change lanes to provide a better view of a passing point of interest.

Autonomous vehicles can carry passengers on a journey to a destination by automatically piloting the vehicle while executing a navigation route. Autonomous vehicles execute routing and maneuvering in response to presence and movements of other autonomous vehicles, and wherein their algorithm-based movements are amenable to synchronization through alignments of their respective models, assumptions and resultant movements. For example, autonomous vehicles may select the same forward speed in response to the same posted limits, and adhere to consistent lane usage protocols: using a left-most lane for non-stop, highest-allowable speeds, a middle lane for slower speeds to safely transition to a right-most lane used only for slowing needed to safely maneuver to use an exit off-ramp, wherein speeds in all lanes are adjusted to maximize flow based on traffic volume of all autonomous vehicles. Synchronizing movement patterns accordingly for each of a group of autonomous vehicles may thus minimize their respective costs in fuel usage or travel time, minimizing obstructions, relative to flow that accommodates the unpredictable movement patterns of conventional vehicles driven manually. Thus, speeds, maneuvering and loading defined by common or consistent autonomous vehicle movement outputs from common input data results in traffic flow that is smoother and efficient relative to conventional vehicle traffic flow.

To meet the needs of users, it is also generally desirable for autonomous vehicles moving within a synchronized, managed traffic flow to accommodate dynamic, non-essential and even conflicting changes or divergences to a current route from a passenger, such as an instruction to slow and/or to relocate to another, less-optimal lane, in order that passengers may have a better view of a passing point of interest. However, executing such a maneuver in response to a non-essential request may be problematic, for example, imposing a high cost on the passenger vehicle in terms of lost (increased) travel time or fuel or enhance toll costs associated with the use of the other lane, as well as imposing costs on other autonomous vehicles, through impeding their otherwise smoother, more consistent and more efficient rate of forward motion, and thereby increasing their time costs or reducing their efficient fuel usage, particularly where the maneuver causes a traffic jam or back-up.

Aspects of the present invention provide a novel approach to determine when or whether, to execute a requested, non-essential maneuver to maximize the objectives and satisfaction of the autonomous vehicle user, including as a function of balancing the desires of passengers to execute non-essential maneuver requests with the needs and costs of the passenger, and of other autonomous vehicles impacted by a requested vehicle maneuver. Embodiments enable autonomous vehicles to automatically determine and execute navigational maneuvers in response to input data acquired from passengers and other users. Embodiments may condition collection and processing of such acquired input data upon the consent of the user from whom the input data is obtained, and users may generally opt-out of such functionality at any time.

Figure 4:
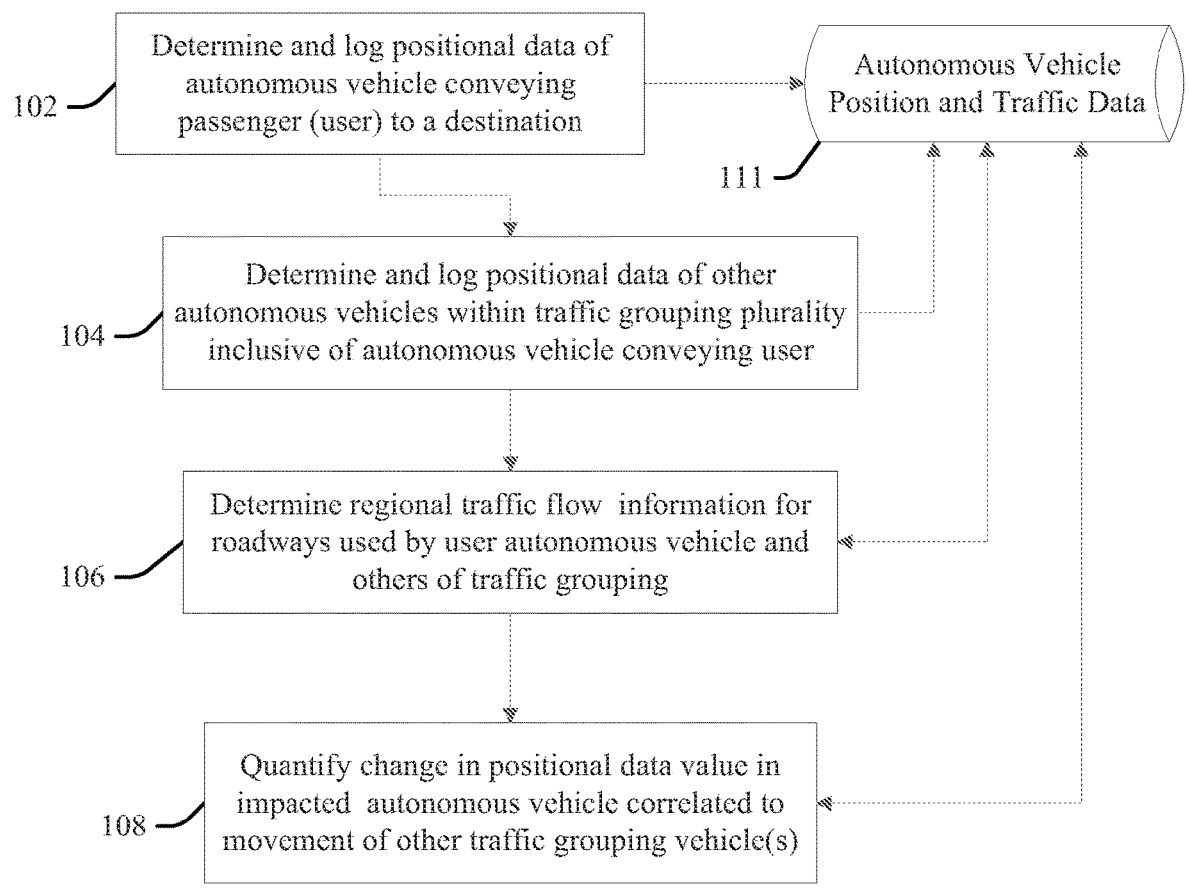
FIG. 4 is a block diagram illustration of an embodiment of the present invention.

FIG. 4 illustrates a system, process, or device according to an embodiment of the present invention. At 102 a processor that is configured according to the present invention (the "configured processor") determines (captures or processes) positional data of an autonomous vehicle as it travels along a route to convey a passenger (also sometimes identified as the user of the present invention) to a destination, and records (logs) said positional data to an Autonomous Vehicle Position and Traffic Data knowledge base or repository 111 (a local or networked storage device, or a remote or cloud-based memory resource or service, etc.). The positional data determined at 102 is inclusive of current geographic coordinates of the autonomous vehicle (for example, as determined from global positioning satellite (GPS) or cellular or other radio or telephony location services), and vehicle speed variance data, the speed and speed changes of the user vehicle relative to a given location position or time.

Thus, embodiments determine at 102 whether the user autonomous vehicle is maintaining a constant speed, or slowing or accelerating, relative to a current time and position, or to any past (historic) time or location; or extrapolates or estimates these values for a future time or location, such as at predicted time or location along a current route that the vehicle is travelling along to a destination. The positional data determined at 102 is also inclusive of vehicle lane position data, which includes lane identification data (which of possible lanes the vehicle is, was or will be in), and for what duration (determining whether the vehicle is remaining within the lane, or if it is changing lanes, and if so, when and where).

At 104 the configured processor determines and records (logs) to the Autonomous Vehicle Position and Traffic repository 111 similar positional data (location, vehicle speed variance and lane position data, etc.) of a plurality of other autonomous vehicles (those that are not carrying the user/passenger) relevant to the movement of the user autonomous vehicle (those that are currently, or potentially, sharing roadways with the user autonomous vehicle while in route to their own destinations), wherein the user and other autonomous vehicles together define a traffic grouping or plurality of autonomous vehicles.

In some embodiments the configured processor acquires destination and routing information in association with the positional data at 102 and 104, including via communication with a central travel management service or resource that manages data or the routing and behavior of the autonomous vehicles via networked communications. Such central management may include the issuance of speed and maneuvering commands that are responsively executed by the autonomous vehicles, such as to achieve a common rate of speed, or times of stopping and restarting and accelerating or decelerating rates, wherein groups of the autonomous vehicles are thereby caused to move essentially in unison.

At 106 the configured processor determines real-time, regional traffic information that comprehends the volume of the flow of traffic on the roadways upon which the user and other autonomous vehicles are travelling, and are projected to travel upon to execute their current (predicted or likely) routing, and of nearby, neighboring and intersecting roadways within a same region or area where the user autonomous vehicle is or will be travelling within and/or through.

At 108, the configured processor executes a positional traffic analysis that quantifies, and logs within the Autonomous Vehicle Position and Traffic Data 111, values of changes caused in the positional data of impacted ones of the traffic grouping autonomous vehicles that result from reacting to (or are otherwise positively correlated to) movements of causal, others of the traffic grouping vehicles, including as determined from vehicle positional sensor and/or real-time traffic sensor data (cameras, traffic counters, etc.) of the Autonomous Vehicle Position and Traffic Data 111.

For example, the configured processor at 108 determines that (correlates), in association to the determined volume of the flow of traffic, a slowing of a first of the autonomous vehicles to a speed that is less than the posted limit on a roadway as a reaction to the slowing (in reaction) of four (4) others of the autonomous vehicles that needed to reduce their speed in order to maintain, appropriate safe spacing relative to each other, including in response to determining that the actions meet a contemporaneous occurrence threshold (that they occur within a specified threshold time proximity to each other); or that an autonomous vehicle changing lanes resulted in one (1) other vehicle slowing down and another one (1) vehicle changing lanes.

Figure 5:
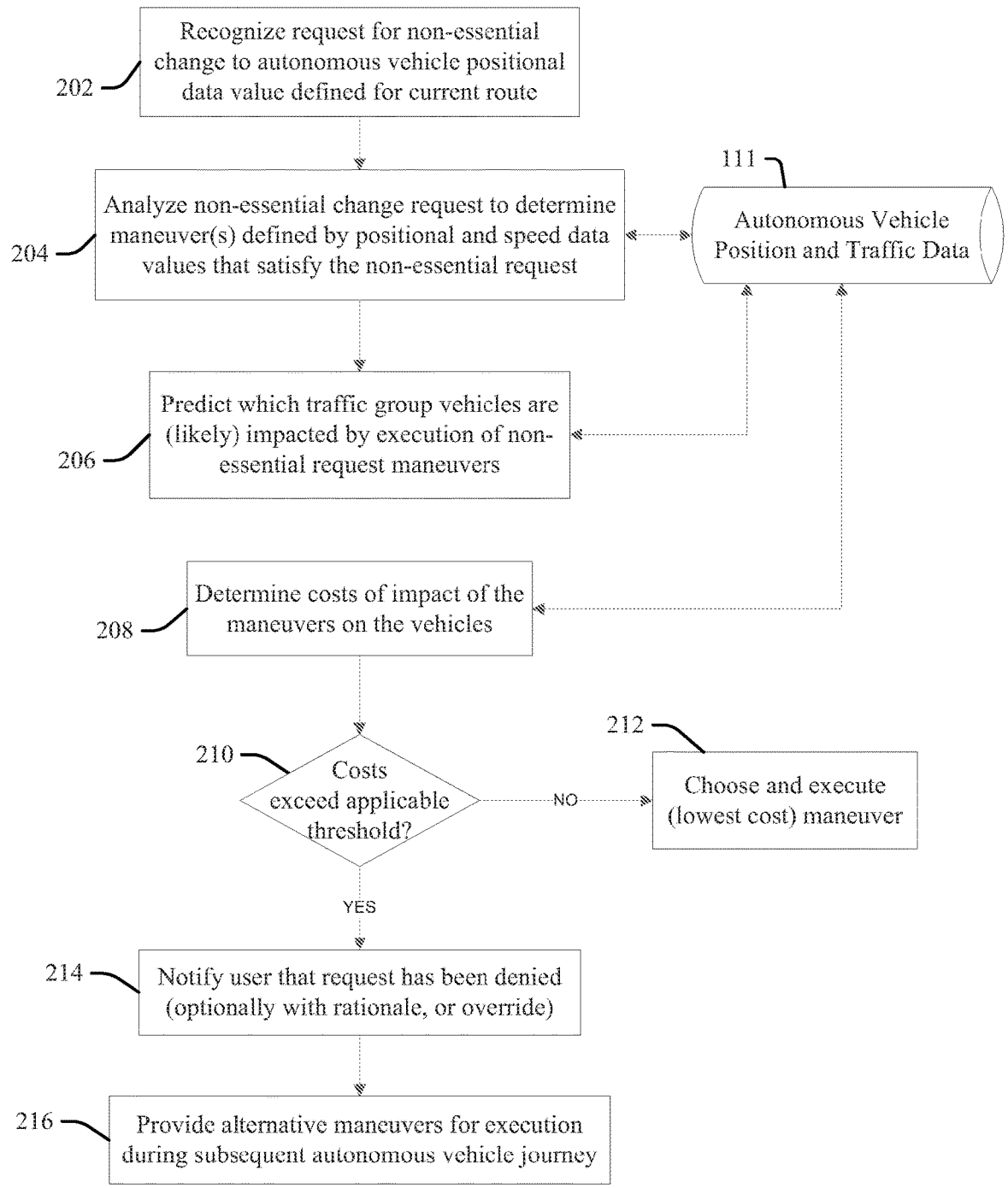
FIG. 5 is a block diagram illustration of another embodiment of the present invention.

FIG. 5 illustrates an embodiment of the present invention that applies the Autonomous Vehicle Position and Traffic Data 111 determined in the process of FIG. 4. Thus, the user or other passenger submits an input that is recognized at 202 by a processer configured according to the present invention (the "configured processor") as request for a non-essential change to positional data values of the autonomous vehicle defined for a current route that are presently being followed (executed) by the user autonomous vehicle to reach a specified destination. The non-essential positional data change defines a maneuver to change lanes, or reduce or increase vehicle speed, for purposes that are determined by the configured processor as not related to navigating to a specified destination of the route. In one example, the configured processor uses voice recognition and speech-to-text processes, systems or services at 202 to recognize that the text content extracted from a spoken request of the user of "Can we slow down to view the scenic overlook on the right?" comprises a request for a non-essential change to positional data defined for the current route, namely to change a rate of travel ("Can we slow down . . . "), and that the stated, overt purpose of the change is not related to navigating to a specified destination of the route (" . . . to view the scenic overlook on the right?").

At 204 the configured processor analyzes the non-essential change request to determine (identify) one or more maneuvers defined by positional and speed data values within the Autonomous Vehicle Position and Traffic Data 111 that satisfy the non-essential request ("non-essential request maneuvers"). In the present example, the configured processor determines that a first non-essential request maneuver of remaining within a current (middle) lane and reducing the current vehicle speed by "X" miles or kilometers per hour, or by "Y" percent, at a point 1.0 kilometer from a current location, through 1.5 kilometers of travel distance, will likely provide a satisfactory view; and that a second non-essential request maneuver of changing lanes and moving into a right-most lane in 0.3 kilometers while reducing the current vehicle speed by "X" miles or kilometers per hour, or by "Y" percent, through 2.0 kilometers of travel distance, will likely provide a best view (or at least a view that is more satisfactory than the view provided by the first non-essential request maneuver).

At 206 the configured processor predicts which of the traffic group vehicles are (most likely) impacted by execution of the determined, non-essential request maneuvers as a function of the positional data and historical traffic impact data within the Autonomous Vehicle Position and Traffic Data 111 relevant to the execution of the same or similar maneuvers. Thus, in response to observing that an equivalent maneuver in historic data with respect to a decrease in speed followed by a lane change from a current lane to a new lane caused three other autonomous vehicles already in the new lane to slow down in reaction to the lane change, embodiments identify other vehicles that are currently or projected to be behind, next to and in front of the user vehicle, and within a threshold proximity, including three cars that are in the new lane that user vehicle will enter, and behind a projected location of entry into the new lane by the user's autonomous vehicle, at the time of the maneuver as function of speed and lane variance data. Thus, embodiments extrapolate historic impacts to current conditions to predict impacts on said proximate vehicles, identifying which cars in which positions are (most likely) to be slowed, or to have to change lanes to maintain their current speeds or avoid collisions or traffic stoppages.

At 208 the configured processor determines (estimates) costs of the impacts of the maneuvers on the respective, identified vehicles as changes to their respective positional data value that are projected from reaction change values logged to the Autonomous Vehicle Position and Traffic Data 111 (at 108, FIG. 4) in proportion to similarity of volume of traffic flow on common roadways at the time of the request to the volumes of traffic flow associated to the logged reaction change values, and as function of the respective vehicle positional data. Embodiments may also define costs in terms of imposing extra time required to reach a destination, extra energy expenditure, likely dissatisfaction of passengers due to being jostled by sudden turns or evasive maneuvers, etc.

At 210 the configured processor determines whether the impact costs exceed an applicable threshold. If not, then at 212 the configured processor chooses and executes the lowest cost option (between multiple maneuvers determined at 204).

Otherwise, at 214 the configured processor notifies the requesting user that the non-essential request has been denied, and in some embodiments providing the rationale for the denial (for example, stating the predicted impact on surrounding traffic if the change were made exceeds allowable impact costs). Some embodiments enable the user to override the denial at 214, and have the autonomous vehicle perform the non-essential change anyway, including as a function of accepting responsibility for some or all the impact costs on the other vehicles.

Some embodiments further suggest or provide alternative maneuvers at 216 for selection and execution during a subsequent autonomous vehicle journey. For example, the return trip from the current destination may offer the ability to fulfil requests without negatively impacting other travelers on the roadway, or the current user of autonomous vehicle (with costs that exceed an applicable threshold in a subsequent iteration at 210); or, on the way to the current destination the configured processor determines that not enough time is available to fulfill the request under current traffic conditions and still make it to the destination within an applicable time deadline, but that the tentative return trip can accommodate the required, additional time; or the configured processor determines that calendar data indicates that the user is travelling again to the same destination, or near the point of interest on a route to a different destination, on a future date, and suggests that the request be added to itinerary of that future travel route.

Embodiment may select and apply different, and multiple thresholds at 210. For example, the configured processor may first apply a feasibility threshold to the cost value determined at 208, wherein the request costs must be below this threshold to be feasible (possible).

Non-essential changes related to viewing scenic overlooks may have a lower threshold applied at 210, so that they only occur if there is little to no impact on surrounding traffic. In contrast, non-essential changes that advance (are in or benefit) the public interest, or that enhance safety, such as related to checking if a driver of a stalled vehicle is OK, may be assigned a relatively higher cost threshold, so that they will be approved at 210 even if there is a higher cost or impact to surrounding traffic relative to the lower enhanced threshold applied to the scenic viewing request.

Thus, embodiments of the present invention focus on the assessment and approval or denial of non-essential changes to routing requested by the passenger of an autonomous vehicle as a function of cost to other travelers. When a user requests a change on a journey that is deemed non-essential to the overall objective of the travel, embodiments determine the costs or impacts of the request on surrounding traffic, and thereby incorporate considerations of impacts on others, on the greater public good, in deciding whether to grant the request, including as a function of the (relative) importance of the non-essential change request.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
   determining positional data for each of a plurality of autonomous vehicles that are travelling on a common roadway, wherein the positional data comprises geographic coordinate location data, vehicle speed and speed change data and vehicle lane position data;
   determining a reaction value as an amount of change in the positional data of a first of the autonomous vehicles caused by a positional change of another, second of the autonomous vehicles;
   associating the reaction value to a volume of traffic flow on the common roadway at a time of occurrence of the amount of change in the positional data of the first autonomous vehicle;
   in response to a request for a change to positional data of a third of the autonomous vehicles, estimating a cost of the request as a change to the positional data of a fourth of the autonomous vehicles that is projected from the reaction value; and
   executing the change to positional data of the third of the autonomous vehicles based on the estimated cost.

2. The method of claim 1, wherein the request is refers to positional data change request that is associated to a purpose that diverges from a current navigation route to a specified destination of the third autonomous vehicle, and the method further comprising:
   selecting a cost value threshold as a function of identification as applicable to the purpose associated to the positional data change request; and
   executing the positional data change request in response to determining that the estimated cost of the request does not exceed the selected cost value threshold.

3. The method of claim 2, further comprising:
   identifying the fourth vehicle as a one of group of autonomous vehicles that are within a threshold proximity to the third vehicle that is impacted by the change in positional data of the third vehicle based on a function of historical positional and traffic impact data associated to the reaction value amount of change.

4. The method of claim 2, further comprising:
   determining a plurality of maneuvers that each generate the request to the positional data of the third autonomous vehicle; and
   executing the positional data change request by executing a lowest cost one of the determined plurality of maneuvers.

5. The method of claim 2, further comprising:
   in response to determining that the estimated cost of the request exceeds the selected cost value threshold, identifying another opportunity to execute the positional data change request that occurs at a time of a subsequent autonomous vehicle journey wherein executing the positional data change request does not exceed the selected cost value threshold.

6. The method of claim 2, further comprising:
determining whether a rationale associated with the of the positional data change request satisfies a public interest; and
increasing a value of the selected cost value threshold in response to determining that the purpose of the positional data change request benefits the public interest.

7. A computer system, comprising:
a computer processor;
a computer readable memory in circuit communication with the computer processor; and
a computer readable storage medium in circuit communication with the computer processor;
wherein the computer processor executes program instructions stored on the computer readable storage medium via the computer readable memory and thereby:
determines positional data for each of a plurality of autonomous vehicles that are travelling on a common roadway, wherein the positional data comprises geographic coordinate location data, vehicle speed and speed change data and vehicle lane position data;
determines a reaction value as an amount of change in the positional data of a first of the autonomous vehicles caused by a positional change of another, second of the autonomous vehicles;
associates the reaction value to a volume of traffic flow on the common roadway at a time of occurrence of the amount of change in the positional data of the first autonomous vehicle;
in response to a request for a change to positional data of a third of the autonomous vehicles, a cost of the request as a change to the positional data of a fourth of the autonomous vehicles that is projected from the reaction value; and
execute the change to positional data of the third of the autonomous vehicles based on the estimated cost.

8. The system of claim 7, wherein the request refers to positional data change request that is associated to a purpose that diverges from a current navigation route to a specified destination of the third autonomous vehicle, and wherein the processor executes program instructions stored on the computer readable storage medium via the computer readable memory and thereby:
selects a cost value threshold as a function of identification as applicable to the purpose associated to the positional data change request; and
executes the positional data change request in response to determining that the estimated cost of the request does not exceed the selected cost value threshold.

9. The system of claim 8, wherein the processor executes program instructions stored on the computer readable storage medium via the computer readable memory and thereby:
identifies the fourth vehicle as a one of group of autonomous vehicles that are within a threshold proximity to the third vehicle that is impacted by the change in positional data of the third vehicle based on a function of historical positional and traffic impact data associated to the reaction value amount of change.

10. The system of claim 8, wherein the processor executes program instructions stored on the computer readable storage medium via the computer readable memory and thereby:
determines a plurality of maneuvers that each generate the request to the positional data of the third autonomous vehicle; and
executes the positional data change request by executing a lowest cost one of the determined plurality of maneuvers.

11. The system of claim 8, wherein the processor executes program instructions stored on the computer readable storage medium via the computer readable memory and thereby:
in response to determining that the estimated cost of the request exceeds the selected cost value threshold, identifies another opportunity to execute the positional data change request that occurs at a time of a subsequent autonomous vehicle journey wherein executing the positional data change request does not exceed the selected cost value threshold.

12. The system of claim 8, wherein the processor executes program instructions stored on the computer readable storage medium via the computer readable memory and thereby:
determines whether a rationale associated with the of the positional data change request satisfies a public interest; and
increases a value of the selected cost value threshold in response to determining that the purpose of the positional data change request benefits the public interest.

13. A computer program product, comprising:
a computer readable storage medium having computer readable program code embodied therewith, the computer readable program code comprising instructions for execution by a computer processor that causes the computer processor to:
determines positional data for each of a plurality of autonomous vehicles that are travelling on a common roadway, wherein the positional data comprises geographic coordinate location data, vehicle speed and speed change data and vehicle lane position data;
determines a reaction value as an amount of change in the positional data of a first of the autonomous vehicles caused by a positional change of another, second of the autonomous vehicles;
associates the reaction value to a volume of traffic flow on the common roadway at a time of occurrence of the amount of change in the positional data of the first autonomous vehicle;
in response to a request for a change to positional data of a third of the autonomous vehicles, a cost of the request as a change to the positional data of a fourth of the autonomous vehicles that is projected from the reaction value; and
execute the change to positional data of the third of the autonomous vehicles based on the estimated cost.

14. The computer program product of claim 13, wherein the request refers to positional data change request that is associated to a purpose that diverges from a current navigation route to a specified destination of the third autonomous vehicle, and wherein the instructions for execution cause the computer processor to:
select a cost value threshold as a function of identification as applicable to the purpose associated to the positional data change request; and
execute the positional data change request in response to determining that the estimated cost of the request does not exceed the selected cost value threshold.

15. The computer program product of claim 14, wherein the instructions for execution cause the computer processor to:
identify the fourth vehicle as a one of group of autonomous vehicles that are within a threshold proximity to the third vehicle that is impacted by the change in positional data of the third vehicle based on a function of historical positional and traffic impact data associated to the reaction value amount of change.

16. The computer program product of claim 15, wherein the instructions for execution cause the computer processor to:
  determine a plurality of maneuvers that each generate the request to the positional data of the third autonomous vehicle; and
  execute the positional data change request by executing a lowest cost one of the determined plurality of maneuvers.

17. The computer program product of claim 15, wherein the instructions for execution cause the computer processor to:
  in response to determining that the estimated cost of the request exceeds the selected cost value threshold, identify another opportunity to execute the positional data change request that occurs at a time of a subsequent autonomous vehicle journey wherein executing the positional data change request does not exceed the selected cost value threshold.

18. The computer program product of claim 15, wherein the instructions for execution cause the computer processor to:
  determine whether a rationale associated with the of the positional data change request satisfies a public interest; and
  increase a value of the selected cost value threshold in response to determining that the purpose of the positional data change request benefits the public interest.

19. The computer-implemented method of claim 1, further comprising:
  determining when to execute a requested maneuver of an autonomous vehicle of the plurality of autonomous vehicles; and
  executing the requested maneuver of the autonomous vehicle based on positional data of other autonomous vehicles of the plurality of autonomous vehicles.

\* \* \* \* \*